(12) United States Patent
Yamada et al.

(10) Patent No.: US 9,290,696 B2
(45) Date of Patent: Mar. 22, 2016

(54) SOIL IMPROVEMENT AGENT COMPOSITION

(75) Inventors: Ken Yamada, Tokyo (JP); Hiroyuki Izumoto, Tokyo (JP); Rieko Oba, Kokubunji (JP); Takaaki Kano, Tokyo (JP); Minako Matoba, Ichikawa (JP)

(73) Assignee: LION SPECIALTY CHEMICALS CO., LTD., Tokyo (JP)

( * ) Notice: Subject to any disclaimer, the term of this patent is extended or adjusted under 35 U.S.C. 154(b) by 225 days.

(21) Appl. No.: 13/883,490

(22) PCT Filed: Nov. 10, 2011

(86) PCT No.: PCT/JP2011/075940
§ 371 (c)(1),
(2), (4) Date: May 3, 2013

(87) PCT Pub. No.: WO2012/063899
PCT Pub. Date: May 18, 2012

(65) Prior Publication Data
US 2013/0221270 A1 Aug. 29, 2013

(30) Foreign Application Priority Data
Nov. 10, 2010 (JP) .................................. 2010-251955

(51) Int. Cl.
*C09K 17/14* (2006.01)
*C09K 17/18* (2006.01)

(52) U.S. Cl.
CPC ................. *C09K 17/14* (2013.01); *C09K 17/18* (2013.01)

(58) Field of Classification Search
None
See application file for complete search history.

(56) References Cited

U.S. PATENT DOCUMENTS

| 5,731,268 | A * | 3/1998 | Taguchi et al. | 504/351 |
| 5,921,023 | A * | 7/1999 | Ogawa et al. | 47/48.5 |
| 6,481,153 | B1 * | 11/2002 | Petrea et al. | 47/1.01 R |
| 6,857,225 | B2 * | 2/2005 | Petrea et al. | 47/58.1 SC |
| 8,969,604 | B2 * | 3/2015 | Kanetani et al. | 554/167 |
| 2003/0106261 | A1 * | 6/2003 | Petrea et al. | 47/58.1 SC |
| 2004/0261314 | A1 * | 12/2004 | Petrea et al. | 47/58.1 SC |
| 2011/0092370 | A1 * | 4/2011 | Kanetani et al. | 504/358 |
| 2013/0131363 | A1 * | 5/2013 | Kanetani et al. | 554/167 |

FOREIGN PATENT DOCUMENTS

| JP | 08-157819 A | 6/1996 |
| JP | 10-60437 A | 3/1998 |
| JP | 2002-20749 A | 1/2002 |
| JP | 2009-132905 A | 6/2009 |

* cited by examiner

*Primary Examiner* — Joseph D Anthony
(74) *Attorney, Agent, or Firm* — Nath, Goldberg & Meyer; Joshua B. Goldberg; Tanya E. Harkins

(57) ABSTRACT

The invention provides a soil improvement agent composition which contains (A) a fatty acid polyoxyalkylene alkyl ether represented by formula (1): $R_1CO\,(EO)m\,(PO)n\,OR_2$ (1) wherein $R_1$ is a straight-chain or branched hydrocarbon group having 13 to 21 carbon atoms, EO represents ethylene oxide, m is a number of 2 to 10, PO represents propylene oxide, n is a number of 1 to 4, and $R_2$ is a hydrocarbon group having 1 to 3 carbon atoms; and (B) a polyoxyalkylene alkyl ether represented by formula (2): $R_3O\,(EO)x\,(PO)y\,H$ (2) wherein $R_3$ is a straight-chain or branched hydrocarbon group having 8 to 14 carbon atoms, EO represents ethylene oxide, x is a number of 7 to 12, PO represents propylene oxide, and y is a number of 0 to 3.

3 Claims, No Drawings

SOIL IMPROVEMENT AGENT COMPOSITION

This is a National Phase Application filed under 35 U.S.C. 371 as a national stage of PCT/JP2011/075940, filed on 10 Nov. 2011, an application claiming the benefit from Japanese Application No. 2010-251955, filed on 10 Nov. 2010, the entire content of each of which is hereby incorporated by reference in its entirety.

TECHNICAL FIELD

The present invention relates to a soil improvement agent composition. In particular, the invention relates to a soil improvement agent composition that can be used for turf grass of golf courses and the like and is capable of caring for the grass.

BACKGROUND ART

One of the troubles with the turf grass on the fairway, putting green and the like of golf courses is dry spot, which is also called localized dry spot or local dry spot, dry patch or dispersed dry spot. The dry spot is damage appearing in patches on the surface of the turf grass due to dryness, which may finally lead to withering of the grass when the condition becomes worse.

The causes of the dry spot have not been completely found out. The reasons are deemed to be uneven water sprinkling, removal of soil surface by rain or sprinkled water, consolidation of soil, soil made water-repellant, and the like.

Specifically, methods of sprinkling particular compounds on the soil are disclosed (JP 2002-20749 A and JP 10-60437 A) to prevent the dry spot from occurring. However, there remain some problems including chemical damage by which the grass turns yellow.

SUMMARY OF INVENTION

Technical Problem

An object of the invention is to provide a soil improvement agent composition that can prevent occurrence of the dry spot by improving the water penetration of soil, with the chemical damage being minimized.

Solution to Problem

As a result of the present inventors' extensive studies, it was found that the occurrence of dry spot can be prevented by using particular nonionic surfactants in combination. Namely, the invention provides a soil improvement agent composition comprising;

(A) a fatty acid polyoxyalkylene alkyl ether represented by the following formula (1):

$$R_1CO(EO)m(PO)nOR_2 \quad (1)$$

wherein $R_1$ is a straight-chain or branched hydrocarbon group having 13 to 21 carbon atoms, EO represents ethylene oxide, m is a number of 2 to 10, PO represents propylene oxide, n is a number of 1 to 4, and $R_2$ is a hydrocarbon group having 1 to 3 carbon atoms; and (B) a polyoxyalkylene alkyl ether represented by the following formula (2):

$$R_3O(EO)x(PO)yH \quad (2)$$

wherein $R_3$ is a straight-chain or branched hydrocarbon group having 8 to 14 carbon atoms, EO represents ethylene oxide, x is a number of 7 to 12, PO represents propylene oxide, and y is a number of 0 to 3.

Effects of Invention

The composition of the invention can enhance the water penetration of soil, thereby effectively preventing the dry spot, and at the same time, reducing damages induced by chemicals. The composition according to the invention can make water not only penetrate through the soil in a short time, but also stay in the soil for a long time.

DESCRIPTION OF EMBODIMENTS (A) Fatty Acid Polyoxyalkylene Alkyl Ether Represented by Formula (1)

In the formula (1), $R_1$ is a chain hydrocarbon group having 13 to 21 carbon atoms. A straight-chain or branched alkyl group or alkenyl group having 15 to 19 carbon atoms is preferable, and a straight-chain alkyl group or alkenyl group having 15 to 19 carbon atoms is more preferable. In particular, a straight-chain alkyl group or alkenyl group having 17 or 19 carbon atoms is preferred, and a straight-chain alkenyl group having 17 carbon atoms is most preferred.

As described later, the compounds of formula (1) are made from fatty acids as the raw materials, so that $R_1$ in formula (1) is a moiety of the fatty acid residue $R_1CO$. Specific examples of the $R_1CO$ include fatty acid residues from the fatty acids such as myristic acid, 5-methyl tetradecanoic acid, 2,2-dimethyl tetradecanoic acid, pentadecanoic acid, palmitic acid, 9-hexadecenoic acid, margaric acid, stearic acid, oleic acid, vaccenic acid (11-octadecenoic acid), linoleic acid, linolenic acid, nonadecanoic acid, arachic acid, behenic acid, gadoleic acid, eicosadienoic acid, ricinoleic acid (castor oil), erucic acid, brassidic acid, arachidonic acid, 9,10-dihydroxy octadecanoic acid (castor oil), elaidic acid, isostearic acid, palm-derived C18 mixed fatty acids, rape-derived C18 mixed fatty acids, palm kernel-derived C14-C18 mixed fatty acids and the like. The fatty acids as the raw materials may be used alone or in combination.

$R_2$ is a chain hydrocarbon group having 1 to 3 carbon atoms. Specific examples of $R_2$ include methyl, ethyl, propyl, and isopropyl groups. In particular, methyl or ethyl is preferable, and methyl is especially preferable. The monohydric alcohols may be used alone or in combination as the raw materials.

The average number of moles of added ethylene oxide (EO), that is, the number of in is in the range of 2 to 10, preferably 3 to 7, more preferably 4 to 7, and most preferably 5. When the average number of moles (in) is less than 2, or more than 10, occurrence of the chemical damage may not be prevented unfavorably.

The average number of moles of added propylene oxide (PO), that is, the number of n is in the range of 1 to 4, preferably 2 or 3, and more preferably 3. When the average number of moles (n) is less than 1, or more than 4, occurrence of the chemical damage may not be prevented unfavorably.

Specifically, $C_{17}H_{33}CO(EO)_5(PO)_3OCH_3$ or $C_{19}H_{35}CO(EO)_4(PO)_3OC_2H_5$ is particularly preferable as the component (A), and $C_{17}H_{33}CO(EO)_5(PO)_3OCH_3$ is most preferable.

For the fatty acid polyoxyalkylene alkyl ether represented by the above-mentioned formula (1), commercially available products may be used or any conventional methods may be used for the production. The production method is not particularly limited, and a variety of methods described in WO 2009/142304 can be used, for example.

The fatty acid polyoxyalkylene alkyl ether represented by the above-mentioned formula (1) may preferably be contained in an amount of 10 to 80 mass %, more preferably 30 to 80 mass %, further more preferably 40 to 80 mass %, and most preferably 50 to 80 mass %, based on the total mass of the soil conditioner composition according to the invention.

(B) Polyoxyalkylene Alkyl Ether Represented by Formula (2)

In the formula (2), $R_3$ is a straight-chain or branched chain hydrocarbon group having 8 to 14 carbon atoms. In particular, a straight-chain or branched alkyl group having 10 to 13 carbon atoms is preferable, a branched alkyl group having 10 to 13 carbon atoms is more preferable, and a branched alkyl group having 10 or 13 is most preferable.

To be more specific, $R_3$ may preferably represent an alcohol-derived chain hydrocarbon group such as lauryl group, myristyl group or the like from natural fatty acids, and/or a chain hydrocarbon group such as octyl group, nonyl group, decyl group, undecyl group, dodecyl group, tridecyl group, tetradecyl group or the like, derived from synthetic alcohols including branched monohydric alcohols obtainable from the oxo reaction, branched monohydric alcohols obtainable from the Guerbet reaction, branched or straight-chain dihydroxy alcohols such as Softanol (registered trademark) and the like. Those may be used alone or in combination.

The average number of moles of added ethylene oxide (EO), that is, the number of x is in the range of 7 to 12, preferably 7 to 10, and more preferably 8. When the average number of moles (x) is less than 7, or more than 12, penetration of water into the soil will be lowered unfavorably.

The average number of moles of added propylene oxide (PO), that is, the number of y is in the range of 0 to 3, preferably 0 to 2, and more preferably 0. When the average number of moles (y) is more than 3, water penetration of the soil will be lowered unfavorably.

Specifically, $C_{10}H_{21}O(EO)_8H$ or $C_{13}H_{27}O(EO)_9H$ where the alkyl group is a branched alkyl group is particularly preferable as the component (B), and $C_{10}H_{21}O(EO)_8H$ where the alkyl group is branched is more preferable.

For the polyoxyalkylene alkyl ether represented by the above-mentioned formula (2), commercially available products may be used or any conventional methods may be used for the production.

The polyoxyalkylene alkyl ether represented by the above-mentioned formula (2) may preferably be contained in an amount of 10 to 60 mass %, more preferably 20 to 50 mass %, and most preferably 20 to 40 mass %, based on the total mass of the soil improvement agent composition according to the invention.

It is particularly preferable to use as the component (A) a compound represented by formula: $C_{17}H_{33}CO(EO)_5(PO)_3OCH_3$ wherein the straight-chain alkenyl group is a moiety of oleic acid-derived residue; as the component (B) a compound represented by formula: $C_{10}H_{21}O(EO)_8H$ where the branched alkyl group is employed.

The ratio by mass of the component (A) to the component (B) may preferably be in the range of 1.2/1 to 3.6/1, and more preferably 1.5/1 to 2.7/1. When the above-mentioned ratio by mass is less than 1.2, there may be a risk of chemical damage. When the ratio by mass is more than 3.6, the degree of improvement in water penetration of the soil will be small.

The components (A) and (B) may totally be contained, preferably in an amount of 50 to 95 mass %, more preferably 60 to 95 mass %, still more preferably 70 to 95 mass %, and most preferably 90 mass %, based on the total mass of the composition.

In particular, it is preferable that the ratio by mass of the component (A) to the component (B), i.e., (A)/(B), be 1.5/1 to 2.7/1, and at the same time, the components (A) and (B) be totally contained in an amount of 70 to 95 mass % based on the total mass of the composition. It is more preferable that the ratio by mass of the component (A) to the component (B), (A)/(B), be 2.0/1, and at the same time, the components (A) and (B) be totally contained in an amount of 90 mass % based on the total mass of the composition.

The composition may further comprise water, preferably in an amount of 5 to 25 mass %, more preferably 5 to 15 mass %, based on the total mass of the composition. The presence of water to such a degree as mentioned above may advantageously improve the preservation stability of the composition.

So long as the effects of the invention may not be considerably impaired, the soil improvement agent composition of the invention may further comprise optional components in addition to the above-mentioned essential components, for example, other nonionic surfactants than the above compounds of formulas (1) and (2), anionic surfactants, cationic surfactants, amphoteric surfactants, salts, thickeners, diluents, microbicides, solvents, perfumes, coloring agents and the like.

As the solvents, hydrophilic organic solvents such as ethanol, isopropyl alcohol and the like can be used. The solvent may be present or absent in the composition of the invention. The composition free from any solvent is preferable.

The soil improvement agent composition of the invention can be produced by any conventional methods, for example, by mixing the components with stirring to make into various forms such as an aqueous solution type, an aqueous dispersion type and the like.

Usually, the soil improvement agent composition of the invention may be diluted with water or the like until the total concentrations of the components (A) and (B) reach 0.04 to 0.4 mass %, and scattered using an atomizer, motorized spraying machinery. The ones skilled in the art would appropriately change the amount to be scattered depending on the condition of grass and the like. The soil improvement agent composition of the invention can be applied to the turf grass on the putting green, fairway and rough of golf courses, and the grass of parks and the like. In particular, the composition of the invention is effective for the turf grass on the putting green of golf courses.

The invention will now be explained more specifically by referring to the following examples and comparative examples, which are not intended to be limiting of the invention.

EXAMPLES

Examples 1-1 and 1-2 and Comparative Examples 1-1 and 1-2

The components (A) and (B) selected from the following compounds were used at a ratio shown in Table 1. Through stirring and mixing, soil improvement agent compositions were prepared. The term "mass %" shown in the Table indicates the mass % of the component in terms of the active content, based on the total mass of the composition.

The methods shown below were used to determine the penetration properties of the thus prepared soil improvement agent compositions, occurrence of chemical damage at normal temperature, preservation stability of the compositions at high and low temperatures. The results are shown in Table 1.

Component (A)

A-1: $C_{15}H_{31}CO(EO)_8(PO)_2OCH_3$ (laboratory-synthesized product, straight-chain alkyl, the fatty acid residue derived from palmitic acid)

A-2: $C_{17}H_{33}CO(EO)_6(PO)_3OCH_3$ (laboratory-synthesized product, straight-chain alkenyl, the fatty acid residue derived from oleic acid)

Component (B)

B-1: $C_{14}H_{29}O(EO)_{12}H$ (laboratory-synthesized product, straight-chain alkyl)

B-2: $C_{12}H_{25}O(EO)_9H$ (laboratory-synthesized product, straight-chain alkyl)

Examples 2-1 to 2-13 and Comparative Examples 2-1 to 2-4

The components (A) and (B) selected from the following compounds were used at a ratio shown in Tables 2 and 3. Through stirring and mixing, soil improvement agent compositions were prepared. The term "mass %" shown in the Tables indicates the mass % of the component in terms of the active content, based on the total mass of the composition.

The methods shown below were used to determine the penetration properties of the thus prepared soil improvement agent compositions, occurrence of chemical damage at normal temperature and high temperature, preservation stability of the compositions at high and low temperatures. The results are shown in Tables 2 and 3.

Component (A)

a-1: $C_{17}H_{33}CO(EO)_5(PO)_3OCH_3$ (Leofat OC-0503M, made by Lion Corporation, straight-chain alkenyl, the fatty acid residue derived from oleic acid)

a-2: $C_{19}H_{35}CO(EO)_4(PO)_3OC_2H_5$ (laboratory-synthesized product, straight-chain alkenyl, the fatty acid residue derived from eicosadienoic acid)

a-3: $C_{15}H_{31}CO(EO)_8(PO)_2OCH_3$ (laboratory-synthesized product, straight-chain alkyl, the fatty acid residue derived from palmitic acid)

a-4: $C_{17}H_{33}CO(EO)_{11}OCH_3$ (laboratory-synthesized product, straight-chain alkenyl, the fatty acid residue derived from oleic acid)

Component (B)

b-1: $C_{10}H_{21}O(EO)_8H$ (Noigen XL-80, made by DAI-ICHI KOGYO SEIYAKU Co., Ltd., branched alkyl)

b-2: $C_{13}H_{27}O(EO)_9H$ (Leocol TD-90, made by Lion Corporation, branched alkyl)

b-3: $C_{13}H_{27}O(EO)_7(PO)_3H$ (Lionol TD-730, made by Lion Corporation, branched alkyl)

b-4: $C_{13}H_{27}O(EO)_{15}H$ (Leocol TD-150, made by Lion Corporation, branched alkyl)

[Penetration Properties]

The Draves method (M. Minagawa et al., ed. "Senzai Senjo Hyakka Jiten" Asakura Publishing Co., Ltd., 2003, pp. 191-192) was modified according to the invention to evaluate the penetration properties. The details are as given below.

As a sample cloth, a piece of wool felt (20 centimeters long and three centimeters broad) was prepared.

As a test solution, a 0.1% aqueous solution of each soil improvement agent composition was prepared (provided that the term % means the total concentrations of the components (A) and (B)).

The sample cloth was hung on one end of a setting pin (about 0.1 g) bent and shaped into a hook, and a nylon yarn with a length of about 3 cm was attached to the other end of the pin. A weight was fixed to the end of the nylon yarn.

The test solution was poured into a 1000-ml graduated cylinder, and the sample cloth was put into the test solution, with the weight being first failing down and the sample cloth being suspended in the solution. The time (penetration time) was counted from the time when the whole sample cloth became soaked with the test solution until the moment the hooked end of the setting pin began to sink (i.e., the moment when the nylon yarn between the hook and the weight became loose). The shorter the penetration time is, the better penetration properties are considered to be imparted to the solution.

The penetration properties were ranked on the basis of the following criteria:

A: penetration time of less than 15 seconds.

B: penetration time of 15 seconds or more and 20 seconds or less.

C: penetration time of more than 20 seconds.

[Occurrence of Chemical Damage at Normal Temperature]

During the daytime when the temperature was within a range of 20 to 29° C., two liter of the soil improvement agent composition diluted 250 times was scattered on the green of a golf course at a rate of 1 L/m² using a hand-operated atomizer. Four days later, the condition of the grass was visually inspected, and cardboard was cut according to the size of the portions where the grass turned yellow. The ratio of the yellowish grass portions was expressed by mass of the cardboard cut according to the size of the yellowish grass portions.

Namely, the ratio was expressed by the following formula:

Ratio of yellowish grass portions (mass %)=(mass of the cardboard having a uniform thickness which had been cut corresponding to the size of yellowish grass portions/mass of the cardboard with an area of 2 m² and having a uniform thickness)× 100

A: The ratio of yellowish grass portions was less than 1 mass %.

B: The ratio of yellowish grass portions was 1 to 5 mass %.

C: The ratio of yellowish grass portions was more than 5 mass %.

[Occurrence of Chemical Damage at High Temperature]

During the daytime when the temperature was 30° C. or more, two liter of the soil improvement agent composition diluted 250 times was scattered on a nursery (where young grass was grown for preparation for a golf course) at a rate of 1 L/m² using a hand-operated atomizer. Four days later, the condition of the grass was visually inspected, and cardboard was cut according to the size of the portions where the grass turned yellow. The ratio of the yellowish grass portions was expressed by mass of the cardboard cut according to the size of the yellowish grass portions.

Namely, the ratio was expressed by the following formula:

Ratio of yellowish grass portions (mass %)=(mass of the cardboard having a uniform thickness which had been cut corresponding to the size of yellowish grass portions/mass of the cardboard with an area of 2 m² and having a uniform thickness)× 100

A: The ratio of yellowish grass portions was less than 1 mass %.

B: The ratio of yellowish grass portions was 1 to 5 mass %.

C: The ratio of yellowish grass portions was more than 5 mass %.

[Preservation Stability at High Temperature]

50 mL of each soil improvement agent composition was placed into a cylindrical glass container with a diameter of 40 mm and a height of 75 mm, and a lid was closed to achieve tight sealing. The container was stored in a thermostatic chamber of 40° C. for one month. After completion of the storage period, the appearance of the soil improvement agent composition was visually inspected and ranked on the basis of the following criteria:

A: The composition looked homogeneously transparent.

B: White opaque portions or sedimentations were slightly detected, but the composition became homogeneous when returned to room temperature.

C: White opaque portions or sedimentations were partially detected.

[Preservation Stability at Low Temperature]

50 mL of each soil improvement agent composition was placed into a cylindrical glass container with a diameter of 40 mm and a height of 75 mm, and a lid was closed to achieve tight sealing. The container was stored in a thermostatic chamber of −5° C. for one month. After completion of the storage period, the appearance of the soil improvement agent composition was visually inspected and ranked on the basis of the following criteria:

A: The composition looked homogeneously transparent.

B: White opaque portions or sedimentations were slightly detected, but the composition became homogeneous when returned to room temperature.

C: White opaque portions or sedimentations were partially detected.

TABLE 1

|  |  |  | Examples | | Comparative Examples | |
|---|---|---|---|---|---|---|
|  |  |  | 1-1 | 1-2 | 1-1 | 1-2 |
| Component (A) (mass %) | A-1 | $C_{15}H_{31}CO(EO)_8(PO)_2OCH_3$ | 20 |  | 60 |  |
|  | A-2 | $C_{17}H_{33}CO(EO)_6(PO)_3OCH_3$ |  | 30 |  |  |
| Component (B) (mass %) | B-1 | $C_{14}H_{29}O(EO)_{12}H$ | 40 |  |  | 60 |
|  | B-2 | $C_{12}H_{25}O(EO)_9H$ |  | 30 |  |  |
| Water (mass %) |  |  | 40 | 40 | 40 | 40 |
| A/B (ratio by mass) |  |  | 0.5 | 1.0 | — | — |
| A + B (mass %) |  |  | 60 | 60 | — | — |
| Penetration properties (Rank) |  |  | A | B | C | B |
| Penetration time (Time in seconds) |  |  | 12 | 16 | 35 | 18 |
| Occurrence of chemical damage at normal temperature (Rank) |  |  | B | B | B | C |
| Occurrence of chemical damage at normal temperature (Ratio (%) of yellowish grass portions) |  |  | 5 | 2 | 2 | 15 |
| Preservation stability at high temperature |  |  | B | B | B | B |
| Preservation stability at low temperature |  |  | B | B | B | B |

As can be seen from Table 1, the soil improvement agent compositions according to Examples 1-1 and 1-2 show excellent penetration properties and can prevent the occurrence of chemical damage at normal temperature.

TABLE 2

|  |  |  | Examples | | | | | | |
|---|---|---|---|---|---|---|---|---|---|
|  |  |  | 2-1 | 2-2 | 2-3 | 2-4 | 2-5 | 2-6 | 2-7 |
| Component (A) (mass %) | a-1 | $C_{17}H_{33}CO(EO)_5(PO)_3OCH_3$ | 65 | 55 | 78 | 60 | 60 |  |  |
|  | a-2 | $C_{19}H_{35}CO(EO)_4(PO)_3OC_2H_5$ |  |  |  |  |  | 60 | 60 |
|  | a-3 | $C_{15}H_{31}CO(EO)_8(PO)_2OCH_3$ |  |  |  |  |  |  |  |
| Component (B) (mass %) | b-1 | $C_{10}H_{21}O(EO)_8H$ | 35 | 45 | 22 |  | 30 | 30 |  |
|  | b-2 | $C_{13}H_{27}O(EO)_9H$ |  |  |  | 30 |  |  | 30 |
|  | b-3 | $C_{13}H_{27}O(EO)_7(PO)_3H$ |  |  |  |  |  |  |  |
| Isopropyl alcohol (mass %) |  |  | 0 | 0 | 0 | 10 | 10 | 10 | 10 |
| Water (mass %) |  |  | 0 | 0 | 0 | 0 | 0 | 0 | 0 |
| A/B (ratio by mass) |  |  | 1.9 | 1.2 | 3.5 | 2.0 | 2.0 | 2.0 | 2.0 |
| A + B (mass %) |  |  | 100 | 100 | 100 | 90 | 90 | 90 | 90 |
| Penetration properties (Rank) |  |  | A | A | B | A | A | A | A |
| Penetration time (Time in seconds) |  |  | 9 | 8 | 17 | 11 | 10 | 12 | 13 |
| Occurrence of chemical damage at normal temperature (Rank) |  |  | A | B | A | A | A | A | A |
| Occurrence of chemical damage at normal temperature (Ratio (%) of yellowish grass portions) |  |  | 0 | 1 | 0 | 0 | 0 | 0 | 0 |
| Occurrence of chemical damage at high temperature (Rank) |  |  | A | B | A | A | A | B | B |
| Occurrence of chemical damage at high temperature (Ratio (%) of yellowish grass portions) |  |  | 0 | 3 | 0 | 0 | 0 | 1 | 1 |
| Preservation stability at high temperature |  |  | B | B | B | A | A | A | A |
| Preservation stability at low temperature |  |  | B | B | B | A | A | A | A |

|  |  |  | Examples | | | | | |
|---|---|---|---|---|---|---|---|---|
|  |  |  | 2-8 | 2-9 | 2-10 | 2-11 | 2-12 | 2-13 |
| Component (A) (mass %) | a-1 | $C_{17}H_{33}CO(EO)_5(PO)_3OCH_3$ |  |  | 64 | 46 | 46 | 34 |
|  | a-2 | $C_{19}H_{35}CO(EO)_4(PO)_3OC_2H_5$ |  | 55 |  |  |  |  |
|  | a-3 | $C_{15}H_{31}CO(EO)_8(PO)_2OCH_3$ | 60 |  |  |  |  |  |
| Component (B) (mass %) | b-1 | $C_{10}H_{21}O(EO)_8H$ |  |  | 31 | 24 | 24 | 16 |
|  | b-2 | $C_{13}H_{27}O(EO)_9H$ |  | 35 |  |  |  |  |
|  | b-3 | $C_{13}H_{27}O(EO)_7(PO)_3H$ | 30 |  |  |  |  |  |
| Isopropyl alcohol (mass %) |  |  |  |  |  |  | 20 | 40 |
| Water (mass %) |  |  | 10 | 10 | 5 | 30 | 10 | 10 |
| A/B (ratio by mass) |  |  | 2.0 | 1.6 | 2.1 | 1.9 | 1.9 | 2.1 |
| A + B (mass %) |  |  | 90 | 90 | 95 | 70 | 70 | 50 |
| Penetration properties (Rank) |  |  | B | A | A | A | A | B |
| Penetration time (Time in seconds) |  |  | 17 | 10 | 10 | 14 | 14 | 19 |
| Occurrence of chemical damage at normal temperature (Rank) |  |  | A | B | A | B | B | B |
| Occurrence of chemical damage at normal temperature (Ratio (%) of yellowish grass portions) |  |  | 0 | 1 | 0 | 1 | 1 | 2 |

TABLE 2-continued

| | | | | | | |
|---|---|---|---|---|---|---|
| Occurrence of chemical damage at high temperature (Rank) | B | B | A | B | B | B |
| Occurrence of chemical damage at high temperature (Ratio (%) of yellowish grass portions) | 2 | 3 | 0 | 4 | 4 | 5 |
| Preservation stability at high temperature | A | A | B | A | B | B |
| Preservation stability at low temperature | A | A | A | B | A | B |

TABLE 3

| | | Comparative Examples | | | |
|---|---|---|---|---|---|
| | | 2-1 | 2-2 | 2-3 | 2-4 |
| Component (A) (mass %) | a-1 $C_{17}H_{33}CO(EO)_5(PO)_3OCH_3$ | | 65 | | 60 |
| | a-4 $C_{17}H_{33}CO(EO)_{11}OCH_3$ | | | 60 | |
| Component (B) (mass %) | b-1 $C_{10}H_{21}O(EO)_8H$ | 35 | | 30 | |
| | b-4 $C_{13}H_{27}O(EO)_{15}H$ | | | | 30 |
| Water (mass %) | | 10 | 10 | 10 | 10 |
| Isopropyl alcohol (mass %) | | 55 | 25 | 0 | 0 |
| A/B (ratio by mass) | | — | — | — | — |
| Penetration properties (Rank) | | B | C | B | C |
| Penetration time (Time in seconds) | | 15 | 39 | 17 | 24 |
| Occurrence of chemical damage at normal temperature (Rank) | | C | A | B | A |
| Occurrence of chemical damage at normal temperature (Ratio (%) of yellowish grass portions) | | 10 | 0 | 3 | 0 |
| Occurrence of chemical damage at high temperature (Rank) | | C | B | C | B |
| Occurrence of chemical damage at high temperature (Ratio (%) of yellowish grass portions) | | 30 | 2 | 7 | 2 |
| Preservation stability at high temperature | | B | B | C | A |
| Preservation stability at low temperature | | B | A | A | C |

As can be seen from Tables 2 and 3, the soil improvement agent compositions according to Examples 2-1 to 2-13 show excellent penetration properties and can prevent the occurrence of chemical damage at normal temperature and high temperature, and exhibit excellent preservation stability at high temperature and low temperature.

The invention claimed is:

1. A soil improvement agent composition comprising:
   (A) a fatty acid polyoxyalkylene alkyl ether represented by formula (1):

$$R_1CO(EO)m(PO)nOR_2 \quad (1)$$

wherein $R_1$ is a straight-chain or branched hydrocarbon group having 13 to 21 carbon atoms, EO represents ethylene oxide, m is a number of 2 to 10, PO represents propylene oxide, n is a number of 1 to 4, and $R_2$ is a hydrocarbon group having 1 to 3 carbon atoms; and
   (B) a polyoxyalkylene alkyl ether represented by formula (2):

$$R_3O(EO)x(PO)yH \quad (2)$$

wherein $R_3$ is a straight-chain or branched hydrocarbon group having 8 to 14 carbon atoms, EO represents ethylene oxide, x is a number of 7 to 12, PO represents propylene oxide, and y is a number of 0 to 3,
   wherein the ratio by mass of the component (A) to the component (B), expressed as (A)/(B) is from 1.2/1 to 3.6/1.

2. A soil improvement agent composition comprising:
   (A) a fatty acid polyoxyalkylene alkyl ether represented by formula (1):

$$R_1CO(EO)m(PO)nOR_2 \quad (1)$$

wherein $R_1$ is a straight-chain or branched hydrocarbon group having 13 to 21 carbon atoms, EO represents ethylene oxide, m is a number of 2 to 10, PO represents propylene oxide, n is a number of 1 to 4, and $R_2$ is a hydrocarbon group having 1 to 3 carbon atoms; and
   (B) a polyoxyalkylene alkyl ether represented by formula (2):

$$R_3O(EO)x(PO)yH \quad (2)$$

wherein $R_3$ is a straight-chain or branched hydrocarbon group having 8 to 14 carbon atoms, EO represents ethylene oxide, x is a number of 7 to 12, PO represents propylene oxide, and y is a number of 0 to 3,
   wherein the component (A) and the component (B) are totally contained in an amount of 50 to 95 mass % based on the total mass of the composition.

3. A soil improvement agent composition comprising:
   (A) a fatty acid polyoxyalkylene alkyl ether represented by formula (1):

$$R_1CO(EO)m(PO)nOR_2 \quad (1)$$

wherein $R_1$ is a straight-chain or branched hydrocarbon group having 13 to 21 carbon atoms, EO represents ethylene oxide, m is a number of 2 to 10, PO represents propylene oxide, n is a number of 1 to 4, and $R_2$ is a hydrocarbon group having 1 to 3 carbon atoms; and
   (B) a polyoxyalkylene alkyl ether represented by formula (2):

$$R_3O(EO)x(PO)yH \quad (2)$$

wherein $R_3$ is a straight-chain or branched hydrocarbon group having 8 to 14 carbon atoms, EO represents ethylene oxide, x is a number of 7 to 12, PO represents propylene oxide, and y is a number of 0 to 3,
   wherein the ratio by mass of the component (A) to the component (B), expressed as (A)/(B) is within a range of 1.5/1 to 2.7/1, and the component (A) and the component (B) are totally contained in an amount of 70 to 95 mass % based on the total mass of the composition.

\* \* \* \* \*